(12) United States Patent
Joo

(10) Patent No.: US 7,263,058 B2
(45) Date of Patent: Aug. 28, 2007

(54) APPARATUS AND METHOD FOR GENERATING PREAMBLE SEQUENCE IN A BWA COMMUNICATION SYSTEM USING OFDM

(75) Inventor: Pan-Yuh Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 611 days.

(21) Appl. No.: 10/228,659

(22) Filed: Aug. 27, 2002

(65) Prior Publication Data

US 2004/0208253 A1 Oct. 21, 2004

(30) Foreign Application Priority Data

Aug. 27, 2001 (KR) ................. 2001-51900

(51) Int. Cl.
*H04J 11/00* (2006.01)
(52) U.S. Cl. .............. 370/203; 370/208; 370/335; 370/509
(58) Field of Classification Search ........... 370/203, 370/208, 210, 509, 510, 511, 512, 513, 514, 370/515, 335, 336, 337, 342
See application file for complete search history.

(56) References Cited

U.S. PATENT DOCUMENTS

| | | | | |
|---|---|---|---|---|
| 3,947,674 A | * | 3/1976 | Gutleber | 708/250 |
| 5,311,176 A | * | 5/1994 | Gurney | 341/50 |
| 5,559,829 A | * | 9/1996 | Le Strat et al. | 375/141 |
| 5,909,436 A | * | 6/1999 | Engstrom et al. | 370/343 |
| 6,885,653 B2 | * | 4/2005 | Choi et al. | 370/342 |
| 6,937,559 B1 | * | 8/2005 | Kim et al. | 370/209 |
| 7,027,444 B2 | * | 4/2006 | Kim et al. | 370/394 |

OTHER PUBLICATIONS

DaSilva and Sousa, "Multicarrier orthogonal CDMA signals for quasi-synchronous communication systems", Jun. 1994, IEEE Journal on Selected Areas in Communications, vol. 12, pp. 842-852.*
Giardina and Rudrapatna, "Quasi-Walsh PN sequences and their applications in robust CDMA communications systems", Dec. 17-20, 2000, 2000 IEEE International Conference on Personal Wireless Communications, p. 24-27.*

* cited by examiner

*Primary Examiner*—Hassan Kizou
*Assistant Examiner*—Brian T. O'Connor
(74) *Attorney, Agent, or Firm*—The Farrell Law Firm

(57) ABSTRACT

A preamble sequence generating apparatus and method in a BWA communication system using OFDM. An ARM code generator generates at least one ARM code of a different length. A sub-carrier selection and frequency mask unit maps a second number of ARM code components to a second number of sub-carriers among a third number of OFDM sub-carriers distributed equally in a frequency band and maps null components to sub-carriers excluding from the second number of sub-carriers. Here, the second number being the number of (the components of the ARM code) minus (a DC component and a first number of ARM code components set to prevent adjacent channel interference). Then, an IFFT generates a preamble sequence by inverse-fast-Fourier-transforming the sub-carriers received from the sub-carrier and frequency mask unit.

14 Claims, 10 Drawing Sheets

APPARATUS AND METHOD FOR GENERATING PREAMBLE SEQUENCE IN A BWA COMMUNICATION SYSTEM USING OFDM

PRIORITY

This application claims priority to an application entitled "Apparatus and Method for Generating Preamble Sequence in a BWA Communication System Using OFDM" filed in the Korean Industrial Property Office on Aug. 27, 2001 and assigned Serial No. 2001-51900, the contents of which are hereby incorporated by reference.

BACKGROUND OF THE INVENTION

1. Field of the Invention

The present invention relates generally to a BWA (Broadband Wireless Access) communication system using OFDM (Orthogonal Frequency Division Multiplexing), and in particular, to an apparatus and method for generating a preamble sequence using an ARM (Aperiodic Recursive Multiplex) code.

2. Description of the Related Art

In general, a wireless communication system supports wireless communications and includes Nodes B and UEs (User Equipments). A Node B and a UE use transmission frames to support the wireless communications. For transmission and reception of transmission frames, the Node B and the UE must mutually acquire synchronization. For this purpose, the Node B transmits a sync signal to inform the UE of the start of a transmitted frame. The UE then acquires frame timing from the sync signal and demodulates the frame according to the frame timing. A particular preamble sequence that is preset between the Node B and the UE is used as the sync signal. When the preamble sequence is transmitted as a burst signal, its reception performance depends on aperiodic autocorrelation characteristics.

An OFDM communication system uses a preamble sequence with a low PAPR (Peak to Average Power Ratio). The Node B transmits to the UE a short preamble sequence for coarse synchronization concatenated with a long preamble sequence for fine frequency synchronization. On the uplink, the UE transmits to the Node B a long preamble sequence for fine frequency synchronization. In the case of an STC (Space Time Code) frame directed from the Node B to the UE, an STC preamble sequence is configured with the same structure such that STC preamble-based synchronization acquisition and channel estimation is possible in UEs regardless of receiving STC signals or not receiving STC signals.

Similar to the preamble sequence for frame timing acquisition, there exists a sequence for burst synchronization acquisition. In a BWA communication system, for example, using FDD (Frequency Division Multiplexing), a plurality of burst slots exist in a frame. Therefore a slot sync signal is used to find the start of the slots, and a midamble signal exists in each burst slot for burst slot synchronization in the TDD communication system. The slot sync signal or midamble signal is also transmitted in the form of a preset sequence between the Node B and the UE, similar to the frame sync signal.

The OFDM BWA communication system transmits data in a time-multiplexed frame to a plurality of UEs. A frame preamble is transmitted for a predetermined time period from the start of the frame to identify the start of the frame and a burst preamble exists at the start of data due to intermittent data transmission for the UEs in the frame. To detect the start of the data transmission, the UEs receive data preambles. To synchronize to the start of data for data reception, the UEs acquire a preamble signal commonly used throughout the system.

The OFDM communication system employs the same source coding, channel coding, and modulation as non-OFDM communication systems. While data is spread prior to transmission in CDMA (Code Division Multiplexing), data is inverse-fast-Fourier-transformed and guard intervals are inserted into the data in OFDM. Accordingly, OFDM transmits broadband signals using relatively simple hardware. In the OFDM communication system, an RFFT (Inverse Fast Fourier Transformer) outputs a time domain signal for the input of parallel bit/symbol sequences after data modulation. The time domain signal contains multiplexed signals on sub-carriers divided from a broad band. Multiple modulations symbols for an OFDM duration are summed by the IFFT processing.

Transmission of IFFT OFDM symbols without any additional processing, however, causes interference between the previous OFDM symbol and the current OFDM symbol. To eliminate the intersymbol interference (ISI), guard intervals are inserted. The guard interval insertion is achieved by transmitting null data in corresponding positions, but wrong estimation of the start of an OFDM symbol in a receiver may cause interference between sub-carriers and increase an OFDM symbol decision error rate. Hence as a guard interval, a cyclic prefix or a cyclic postprefix is proposed. The cyclic prefix is to copy the last n/1 bits of a time-domain OFDM symbol and insert them in an effective OFDM symbol. The cyclic postprefix is to copy the first 1/n bits of a time-domain OFDM symbol and insert them in an effective OFDM symbol. The duplication and disposition of the first or last portion of an OFDM symbol in a particular OFDM symbol enables acquisition of OFDM symbol time/frequency synchronization in the receiver.

Meanwhile, a transmitted signal is distorted during transmission on a radio channel. The receiver acquires time/frequency synchronization and channel estimation using a preset preamble signal and demodulates the distorted data to symbols in a frequency domain by FFT (Fast Fourier Transform). Then the receiver decodes information data by subjecting the demodulated symbols to channel decoding and source decoding in correspondence with channel coding used in the transmitter.

The preamble signal is used for frame timing synchronization, frequency synchronization, and channel estimation in the OFDM communication system, although guard intervals and pilot sub-carriers can also be used for the same purpose. Known symbols are transmitted as a preamble signal at the start of each frame or data burst. Time/frequency/channel estimation information obtained from the preamble signal is then updated using a guard interval and a pilot sub-carrier in data of the frame.

The preamble sequence must be generated, taking into account the following parameters.

(1) The PAPR of OFDM symbols must be low to maximize the transmission efficiency of a power amplifier in the transmitter. OFDM symbols in the time domain at the output of an IFFT in the transmitter must have a uniform power distribution. In other words, if symbols with a low cross correlation in the frequency domain are input to the IFFT, the IFFT output has a low PAPR.

(2) Since the receiver estimates time/frequency information by cross correlation or autocorrelation, OFDM symbols in the time domain must be repeated. To do so, null data (zeros) are interpolated in a frequency-domain sequence.

(3) A virtual carrier or a guard band is defined to minimize adjacent channel interference. In OFDM being a multi-carrier system, null data is inserted in the outermost sub-carriers in the frequency domain to solve the problem of adjacent channel interference. The outermost sub-carriers are the middle indexes among IFFT input indexes.

Optimum communication performance is achieved only if the above three conditions are satisfied when a preamble sequence is generated in the OFDM communication system.

A frame structure with the above-described preamble will be described below with reference to FIG. 1. FIG. 1 illustrates the structure of a frame in a typical BWA communication system.

Referring to FIG. 1, reference numeral 101 denotes a frame preamble indicating the start of the frame to enable a UE to acquire frame timing synchronization to a Node B. The frame preamble 101 is modulated by BPSK (Binary Phase Shift Keying) or QPSK (Quadrature Phase Shift Keying). Reference numeral 102 denotes the frame containing real information data. The data in the frame 102 is modulated by QPSK, 16QAM (Quadrature Amplitude Modulation), or 64 QAM and then multiplexed in OFDM. N frames are illustrated in FIG. 1. This means that N channels transmit data following downlink/uplink preambles or STC preambles.

As described before, a preamble sequence preset between the transmitter (Node B) and the receiver (UE) is used for frequency synchronization and channel estimation. In view of the burst property of the preamble sequence, it requires a low PAPR and excellent performance in time/frequency synchronization and channel estimation.

FIG. 5 illustrates a preamble structure in the typical BWA communication system. Referring to FIG. 5, a short preamble 501 and long preambles 502 and 503 are used in the BWA communication system. The short preamble 501 is used for coarse synchronization between a Node B and a UE and the long preambles 502 and 503, for fine frequency synchronization. A downlink preamble being the short preamble 501 concatenated to a long preamble is at least 160 samples in duration, and an uplink burst preamble is at least 512 samples in duration. Reference numeral 504 denotes an STC preamble transmitted to UEs regardless of whether they support STC or not, for frequency synchronization acquisition and channel estimation. Hence a BWA system requires preamble signals of different lengths and thus requires an apparatus and method commonly used to generate the different preamble signals, particularly with excellent PAPR characteristics, and time/frequency synchronization and channel estimation performance.

SUMMARY OF THE INVENTION

It is, therefore, an object of the present invention to provide an apparatus and method for generating a preamble sequence in a BWA communication system.

It is another object of the present invention to provide an apparatus and method for simultaneously generating a frame preamble sequence and a burst preamble sequence in a BWA communication system.

It is a further object of the present invention to provide an apparatus and method for generating a preamble sequence with a minimum PAPR in a BWA communication system.

To achieve the above and other objects, an ARM code generator generates at least one ARM code of a different length, and a sub-carrier selection and frequency mask unit maps a second number of ARM code components to a second number of sub-carriers among a third number of OFDM sub-carriers distributed equally in a frequency band and maps null components to sub-carriers excluded from the second number of sub-carriers. Here, the second number being the number of the components of the ARM code, minus, a DC component and a first number of ARM code components set to prevent adjacent channel interference. Then, an IFFT generates a preamble sequence by inverse-fast-Fourier-transforming the sub-carriers received from the sub-carrier and frequency mask unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A preamble sequence proposed in the present invention is applicable to BWA communication systems of which the standardization is being carried out and other communication systems using preamble sequences described above. The preamble sequence is characterized by its low PAPR and thus referred to as an MPP (Minimum PAPR Preamble) sequence. The present invention provides an MPP sequence generating apparatus and method in a BWA communication system. As preamble sequences of the present invention for time offset synchronization, frequency offset synchronization, and channel estimation, a short preamble or a long preamble, and an STC preamble will be described.

Figure 1:
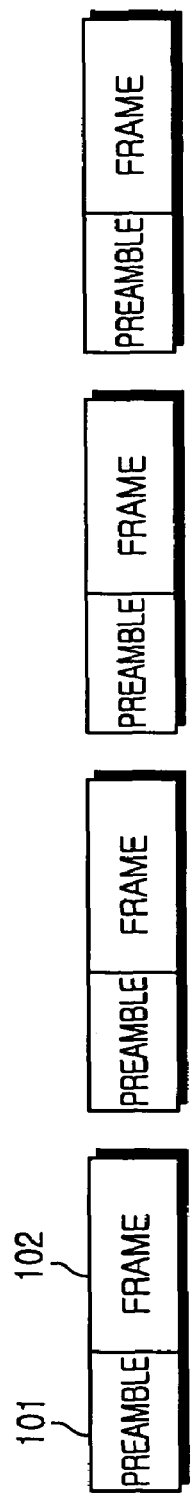
FIG. 1 illustrates a frame structure in a typical BWA communication system.
Figure 2:
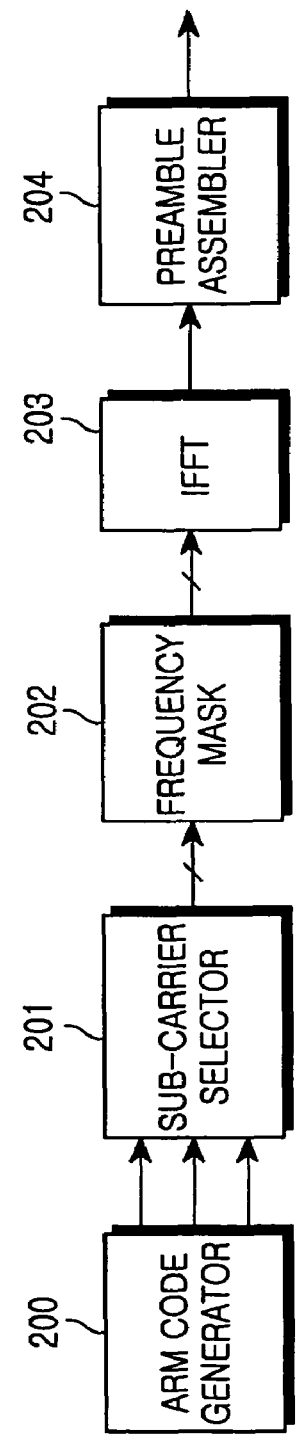
FIG. 2 is a block diagram of an MPP (Minimum PAPR Preamble) sequence generating apparatus according to an embodiment of the present invention.

FIG. 2 is a block diagram of an MPP sequence generating apparatus according to an embodiment of the present invention. Referring to FIG. 2, the MPP sequence generating apparatus is comprised of an ARM code generator 200, a sub-carrier selector 201, a frequency mask 202, an IFFT 203, and a preamble assembler 204. The ARM code generator 200 is disclosed in Korea Patent Application No. 2000-0071092, filed in the U.S. Patent and Trademark Office on Nov. 21, 2001 and assigned application Ser. No. 09/990,557, the contents of which are herein incorporated by reference, and its operation will be described referring to the patent application.

Figure 4:
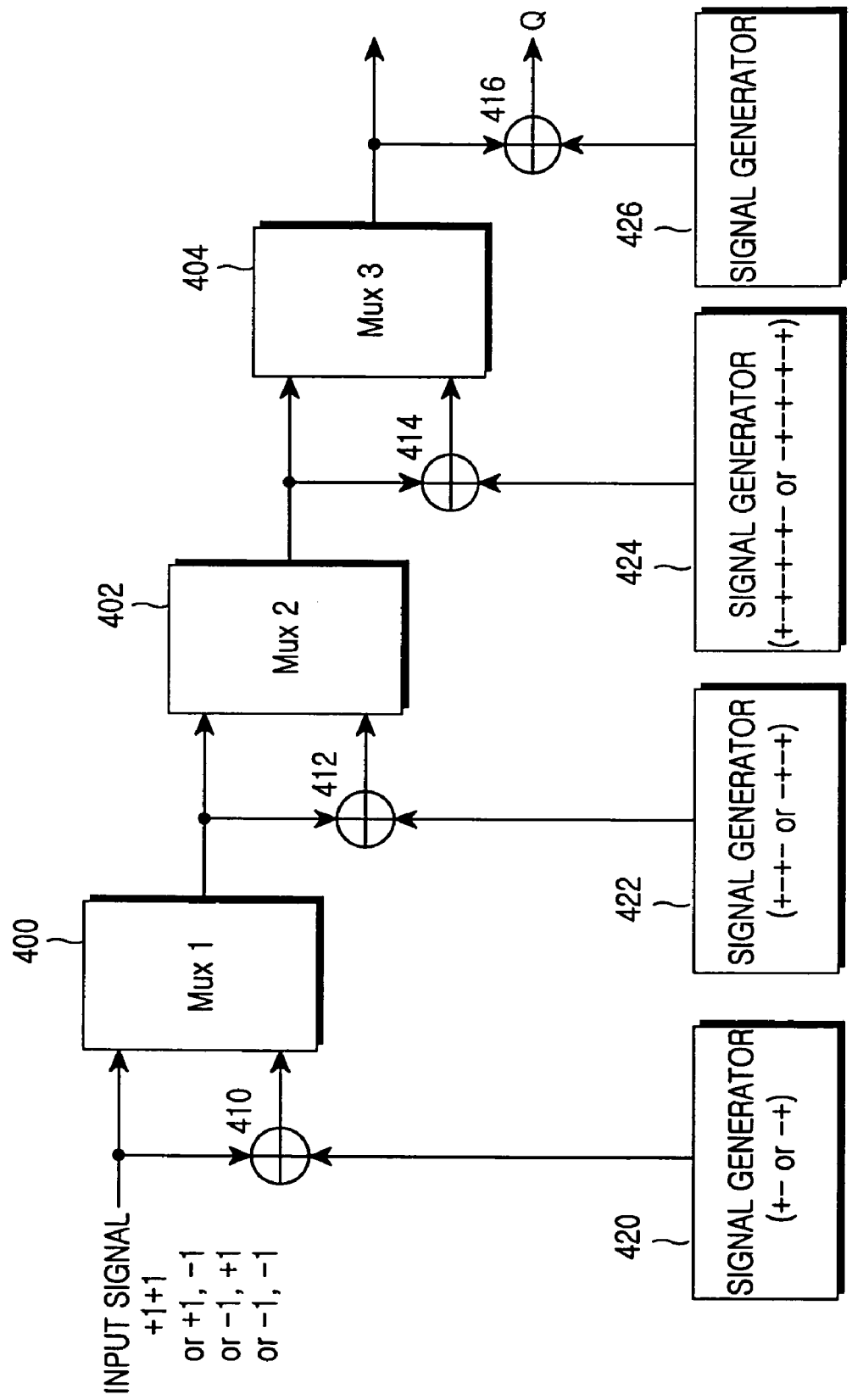
FIG. 4 is a block diagram of an ARM code generator illustrated in FIG. 2.
Figure 5:
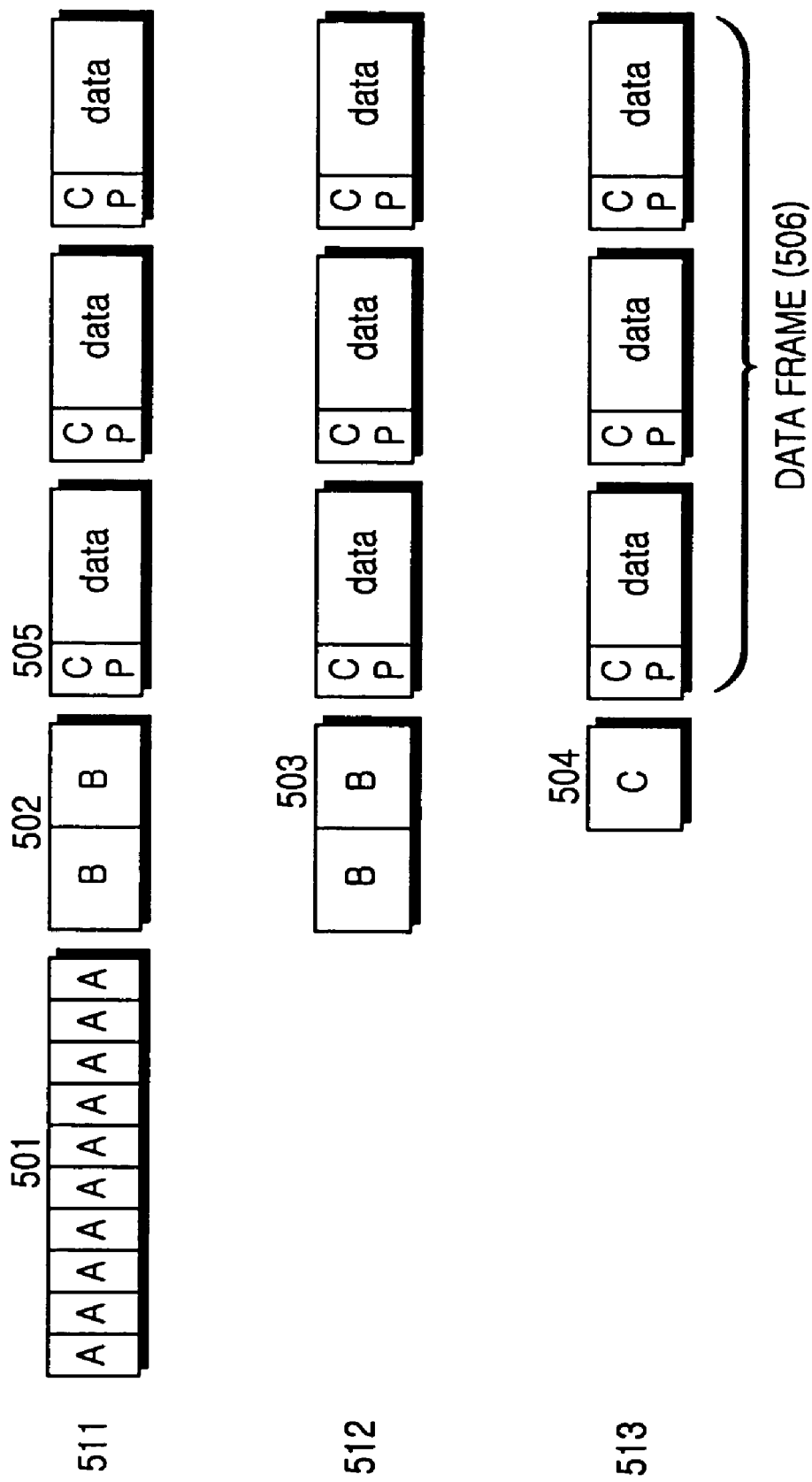
FIG. 5 illustrates the structures of preambles in the typical BWA communication system.

FIG. 4 is a block diagram of the ARM code generator 200. Referring to FIG. 4, the ARM code generator 200 generates a complex ARM code of length 16. A multiplier 410 receives a signal +1 and −1 or −1 and +1 in a sequence of alternating +1s and −1s from a signal generator 420. Regardless of whether +1 or −1 is first received, an ARM code produced from the ARM code generator 200 has the same characteristics. Upon receipt of one of all binary combinations of two bits +1 & +1, +1 & −1, −1 & +1, or −1 & −1, the multiplier 410 multiplies the bits by the signal from the signal generator 420.

A first multiplexer (MUX 1) 400 multiplexes the input signal and the output of the multiplier 410 in time and outputs a 4-bit sequence. A multiplier 412 multiplies the 4-bit sequence by a 4-bit signal received from a signal generator 422 and a second MUX (MUX 2) 402 multiplexes the outputs of the first MUX 400 and the multiplier 412 in time and outputs an 8-bit sequence. A multiplier 414 multiplies the 8-bit sequence output by the second Max 402 by a 8-bit signal received from a signal generator 424, +1, −1, +1, −1, +1, −1, +1, −1 or −1, +1, −1, +1, −1, +1, −1, +1. A third MUX (MUX 3) 404 multiplexes the outputs of the second MUX 402 and the multiplier 414 in time and outputs a 16-bit sequence. The 16-bit sequence becomes an I channel component. At the same time, a multiplier 416 multiplies the 16-bit sequence by a 16-bit signal received from a signal generator 426, +1, −1, +1, −1, +1, −1, +1, −1, +1, −1, +1, −1, +1, −1, +1, −1 or −1, +1, −1, +1, −1, +1, −1, +1, −1, +1, −1, +1, −1, +1, −1, +1 and outputs the product as a Q component. Thus a complex ARM code of length 16 is completely produced.

To generate an ARM code of length 64, the ARM code generator 200 is extended to have two additional MUXes and two additional signal generators. In the same manner, three additional MUXes and three signal generators are required to the ARM code generator 200 to generate an ARM code of 128. That is, to generate an I component and a Q component of an ARM code of length $2^n$, (n−1) stages are required.

In the present invention, if an ARM code sequence of length 16 is required, one of 16 ARM code sequences listed below is selected using the ARM code generator 200. The 16 ARM code sequences of length 16 are generated by outputting four kinds of signals from the first MUX 400 for the input of +1 & +1 and +1 & −1, eight kinds of signals from the second MUX 402, and 16 ARM codes from the third MUX 404. The "i" in the following ARM codes represents the imaginary or Q component.

| (ARM Codes of Length 16) | |
|---|---|
| 1 = | 1 + 1i, 1 − 1i, 1 + 1i, −1 + 1i, |
| | 1 + 1i, 1 − 1i, −1 − 1i, −1 + 1i, |
| | 1 + 1i, 1 − 1i, 1 + 1i, −1 + 1i, |
| | −1 − 1i, 1 − 1i, −1 − 1i, −1 + 1i |

| (ARM Codes of Length 16) | |
|---|---|
| 2 = | 1 − 1i, −1 − 1i, 1 − 1i, 1 + 1i, |
| | 1 − 1i, −1 − 1i, −1 + 1i, 1 + 1i, |
| | 1 − 1i, −1 − 1i, 1 − 1i, 1 + 1i, |
| | −1 + 1i, −1 − 1i, −1 + 1i, 1 + 1i |
| 3 = | 1 + 1i, 1 − 1i, −1 − 1i, −1 + 1i, |
| | 1 + 1i, 1 − 1i, 1 + 1i, −1 + 1i, |
| | 1 + 1i, 1 − 1i, −1 − 1i, −1 + 1i, |
| | −1 − 1i, 1 − 1i, 1 + 1i, −1 + 1i |
| 4 = | 1 − 1i, −1 − 1i, −1 + 1i, 1 + 1i, |
| | 1 − 1i, −1 − 1i, 1 − 1i, 1 + 1i, |
| | 1 − 1i, −1 − 1i, −1 + 1i, 1 + 1i, |
| | −1 + 1i, −1 − 1i, 1 − 1i, 1 + 1i |
| 5 = | 1 + 1i, 1 − 1i, 1 + 1i, −1 + 1i, |
| | −1 − 1i, 1 − 1i, −1 − 1i, −1 + 1i, |
| | 1 + 1i, 1 − 1i, 1 + 1i, −1 + 1i, |
| | 1 + 1i, 1 − 1i, −1 − 1i, −1 + 1i |
| 6 = | 1 − 1i, −1 − 1i, 1 − 1i, 1 + 1i, |
| | −1 + 1i, −1 − 1i, −1 + 1i, 1 + 1i, |
| | 1 − 1i, −1 − 1i, 1 − 1i, 1 + 1i, |
| | 1 − 1i, −1 − 1i, −1 + 1i, 1 + 1i |
| 7 = | 1 + 1i, 1 − 1i, −1 − 1i, −1 + 1i, |
| | −1 − 1i, 1 − 1i, 1 + 1i, −1 + 1i, |
| | 1 + 1i, 1 − 1i, −1 − 1i, −1 + 1i, |
| | 1 + 1i, 1 − 1i, 1 + 1i, −1 + 1i |
| 8 = | 1 − 1i, −1 − 1i, −1 + 1i, 1 + 1i, |
| | −1 + 1i, −1 − 1i, 1 − 1i, 1 + 1i, |
| | 1 − 1i, −1 − 1i, −1 + 1i, 1 + 1i, |
| | 1 − 1i, −1 − 1i, 1 − 1i, 1 + 1i |
| 9 = | 1 + 1i, 1 − 1i, 1 + 1i, −1 + 1i, |
| | 1 + 1i, 1 − 1i, −1 − 1i, −1 + 1i, |
| | −1 − 1i, 1 − 1i, 1 + 1i, −1 + 1i, |
| | −1 − 1i, 1 − 1i, −1 − 1i, −1 + 1i |
| 10 = | 1 − 1i, −1 − 1i, 1 − 1i, 1 + 1i, |
| | 1 − 1i, −1 − 1i, −1 + 1i, 1 + 1i, |
| | −1 + 1i, −1 − 1i, 1 − 1i, 1 + 1i, |
| | −1 + 1i, −1 − 1i, −1 + 1i, 1 + 1i |
| 11 = | 1 + 1i, 1 − 1i, −1 − 1i, −1 + 1i |
| | 1 + 1i, 1 − 1i, 1 + 1i, −1 + 1i, |
| | −1 − 1i, 1 − 1i, −1 − 1i, −1 + 1i, |
| | −1 − 1i, 1 − 1i, 1 + 1i, −1 + 1i |
| 12 = | 1 − 1i, −1 − 1i, −1 + 1i, 1 + 1i, |
| | 1 − 1i, −1 − 1i, 1 − 1i, 1 + 1i, |
| | −1 + 1i, −1 − 1i, −1 + 1i, 1 + 1i, |
| | −1 + 1i, −1 − 1i, 1 − 1i, 1 + 1i |
| 13 = | 1 + 1i, 1 − 1i, 1 + 1i, −1 + 1i, |
| | −1 − 1i, 1 − 1i, −1 − 1i, −1 + 1i, |
| | −1 − 1i, 1 − 1i, 1 + 1i, −1 + 1i, |
| | 1 + 1i, 1 − 1i, −1 − 1i, −1 + 1i |
| 14 = | 1 − 1i, −1 − 1i, 1 − 1i, 1 + 1i, |
| | −1 + 1i, −1 − 1i, −1 + 1i, 1 + 1i, |
| | −1 + 1i, −1 − 1i, 1 − 1i, 1 + 1i, |
| | 1 − 1i, −1 − 1i, −1 + 1i, 1 + 1i |
| 15 = | 1 + 1i, 1 − 1i, −1 − 1i, −1 + 1i, |
| | −1 − 1i, 1 − 1i, 1 + 1i, −1 + 1i, |
| | −1 − 1i, 1 − 1i, −1 − 1i, −1 + 1i, |
| | 1 + 1i, 1 − 1i, 1 + 1i, −1 + 1i |
| 16 = | 1 − 1i, −1 − 1i, −1 + 1i, 1 + 1i, |
| | −1 + 1i, −1 − 1i, 1 − 1i, 1 + 1i, |
| | −1 + 1i, −1 − 1i, −1 + 1i, 1 + 1i, |
| | 1 − 1i, −1 − 1i, 1 − 1i, 1 + 1i |

If an ARM code sequence of length 256 is required, one of 256 ARM code sequences listed below is selected using the ARM code generator 200.

As described before, the ARM code generator 200 can generate ARM code sequences of different lengths. When a controller (not shown) applies a control signal corresponding to an ARM code of a desired length to the ARM code generator 200, the ARM code generator 200 generates an ARM code of the desired length and feeds it to the sub-carrier selector 201.

Returning to FIG. 2, the sub-carrier selector 201 selects sub-carriers for three ARM code sequences of length 16, 256, and 128 received from the ARM code generator 200 according to a desired sequence of length $2^n$, that is, the characteristic of an intended preamble. The frequency mask 202 inserts null data for a DC component and guard intervals in the selected sub-carriers according to an IFFT mode in view of the nature of OFDM. If 53 sub-carriers are selected, the frequency mask 202 generates 64 sub-carriers by inserting 11 null data. If 201 sub-carriers are selected, the frequency mask 202 generates 256 sub-carriers by inserting 55 null data. The IFFT 203 inverse-fast-Fourier-transforms the output of the frequency mask 202 and outputs a time-domain signal. The preamble assembler 204 concatenates the time-domain signal, that is, a short preamble sequence and a long preamble sequence to thereby generate a downlink/uplink preamble or an STC preamble.

Now the operation of the sub-carrier selector 201 and the frequency mask 202 will be described referring to FIG. 3. The sub-carrier selector 201 and the frequency mask 202 are implemented separately as illustrated in FIG. 2. The sub-carrier selector 201 maps the samples of an ARM code generated from the ARM code generator 200 to OFDM sub-carriers. Then the frequency mask 202 deletes samples or inserts null data at predetermined sub-carrier positions for a DC component and a guard interval in the OFDM sub-carriers. For clarity of description, the following description of the sub-carrier selector 201 and the frequency mask 202 is made with the appreciation that they operate integrally.

Figure 3:
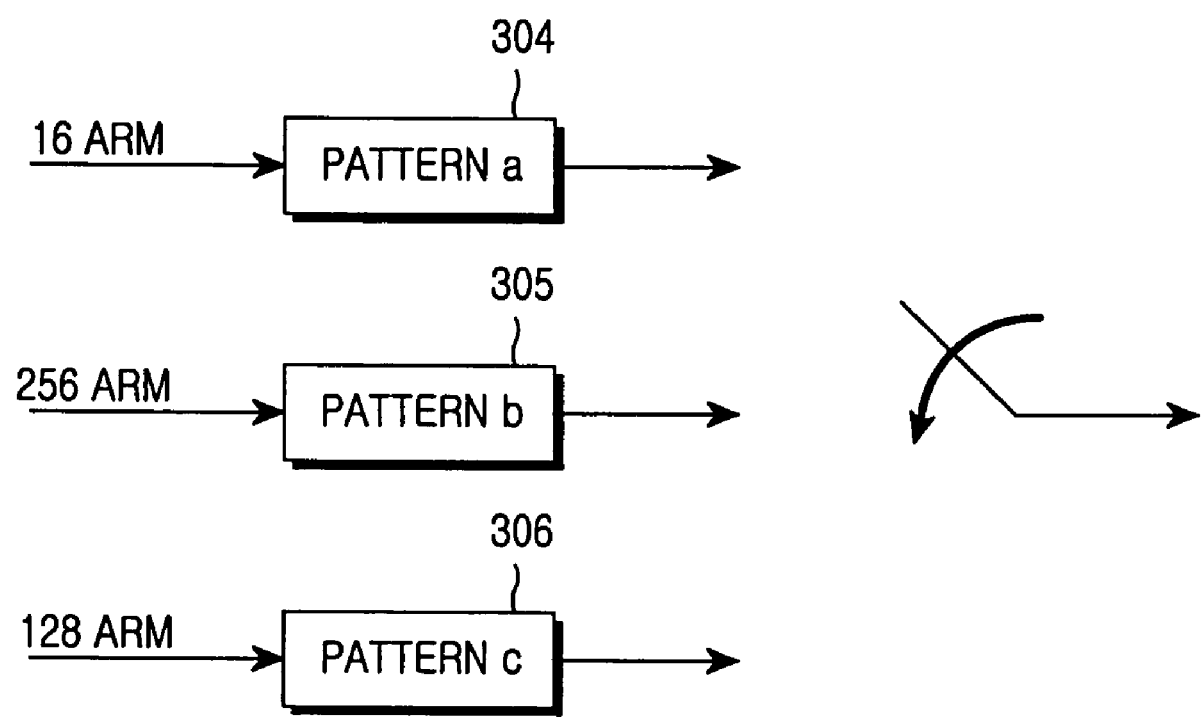
FIG. 3 schematically illustrates the operations of a sub-carrier selector and a frequency mask illustrated in FIG. 2.

FIG. 3 schematically illustrates the operations of the sub-carrier selector 201 and the frequency mask 202. It is assumed that a pattern a generator 304, a pattern b generator 305, and a pattern c generator 306 perform the operations of the sub-carrier selector 201 and the frequency mask 202 according to the lengths of ARM codes (i.e., 16, 256, and 128, respectively), that is, select sub-carriers for the samples of the ARM codes and mask frequencies. Referring to FIG. 3, upon receipt of an ARM code sequence of length 16, the pattern a generator 304 selects sub-carriers for the samples of the ARM code of length 16 among given 64 OFDM sub-carriers. That is, 16 sub-carriers are selected for the 16 samples of the ARM code, a1 to a16. Then the pattern a generator 304 removes the sub-carriers of 4 samples, a13 to a16 from the 16 sub-carriers together with 7 sub-carriers related with the 4 sub-carriers, and inserts null data in the remaining 41 sub-carriers excluding the sub-carriers having the 12 samples. Thus the ARM code of length 16 is patterned into {0, 0, a12, 0, 0, 0, a11, 0, 0, 0, a10, 0, 0, 0, a9, 0, 0, 0, a8, 0, 0, 0, a7, 0, 0, 0, 0 (reference point), 0, 0, 0, a1, 0, 0, 0, a2, 0, 0, 0, a3, 0, 0, 0, a4, 0, 0, 0, a5, 0, 0, 0, a6, 0, 0}.

In the pattern the reference point 0 signifies a DC component in the time domain. The pattern a generator 304 inserts null data in the 4 sub-carriers of the deleted 4 samples and 7 sub-carriers intervening between the sub-carriers in order to define a guard interval with respect to the reference point 0.

Briefly describing, the pattern a generator 304 generates Pattern a for the input of an ARM code of length 16 and then outputs Pattern a to the IFFT 203

Pattern a: {[0,0, a12, 0, 0, 0, a11, 0, 0, 0, a10, 0, 0, 0, a9, 0, 0, 0, a8, 0, 0, 0, a7, 0, 0, 0, (reference point)]0 (DC), 0, 0, 0, a1, 0, 0, 0, a2, 0, 0, 0, a3, 0, 0, 0, a4, 0, 0, 0, a5, 0, 0, 0, a6, 0, 0, 0, . . . , 0, 0, 0, a12, 0, 0, 0, a11, 0, 0, 0, a10, 0, 0, a9, 0, 0, 0, a8, 0, 0, 0, a7, 0, 0, 0}

Upon receipt of an ARM code sequence of length 256, the pattern b generator 305 maps the 256 samples of the ARM code to 256 given OFDM sub-carriers. That is, the 256 samples of the ARM code, b1 to b256 are mapped to the 256 OFDM sub-carriers. Then the pattern b generator 305 removes the sub-carriers of 56 samples, b201 to b256 among the 256 sub-carriers. Thus the ARM code of length 256 is patterned into Pattern b.

Pattern b: {0(DC), b1, b2, b3, b4, b5, . . . , b98, b99, b100, 0, . . . , 0, b200, b199, b198, . . . , b103, b102, b101}

Upon receipt of an ARM code sequence of length 128, the pattern c generator 306 maps the 128 samples of the ARM code to 128 given OFDM sub-carriers. That is, the 128 samples of the ARM code, c1 to c128 are mapped to the 128 OFDM sub-carriers. Then the pattern c generator 306 removes the sub-carriers of 26 samples, c103 to c128 among the 128 sub-carriers. Null data is inserted in the remaining sub-carriers excluding the 102 sub-carriers. Thus the ARM code of length 128 is patterned into Pattern c. Pattern c: {[c102, 0, c101, 0, c100, 0, . . . , c57, 0, c56, 0, c55, 0, c54, 0, c53, c52, 0 (reference point),]0(DC), c1, c2, 0, c3, 0, c4, 0, c5, . . . , 0, c49, 0, c50, 0, c51, 0, . . . 0, c102, 0, c101, 0, c100, 0, . . . , c57, 0, c56, 0, c55, 0, c54, 0, c53, c52, } or {[102, c101, 0c100, 0, c9, 0, . . . , c57, 0, c56, 0, c55, 0, c54, 0, c53, 0, c52, 0 (reference point),]0(DC), c1, 0, c2, 0, c3, 0, c4, 0, c5, . . . , 0, c49, 0, c50, c51, 0, . . . 0, c102, c101, 0, c100, 0, c9, 0, . . . , c57, 0, c56, 0, c55, 0, c54, 0, c53, 0, c52}

Aside from the above two patterns, the pattern c generator 306 can generate an ARM code sequence in Pattern c: {[c0, c100, 0, c99, 0, . . . , c55, 0, c54, 0, c53, 0, c52, 0, c51, 0 (reference point),]0(DC). c1, 0, c2, 0, c3, 0, c4, 0, c5, . . . , 0, c48, 0, c49, 0, c51, 0, 0, . . . 0, c0, c100, 0, c99, 0, . . . , c55, 0, c54, 0, c53, 0, c52, 0, c51,} or {[c100, 0, c99, 0, c98, 0, . . . , c55, 0, c54, 0, c53, 0, c52, 0 c51, 0, 0 (reference point),]0(DC), 0, c1, 0, c2, 0, c3, 0, c4, 0, c5, . . . , 0, c49, 0, 0, . . . , 0, c100, 0, c99, 0, c98, 0, . . . , c55, 0, c54, 0, c53, 0, c52, 0, c51, 0}

Figure 9:
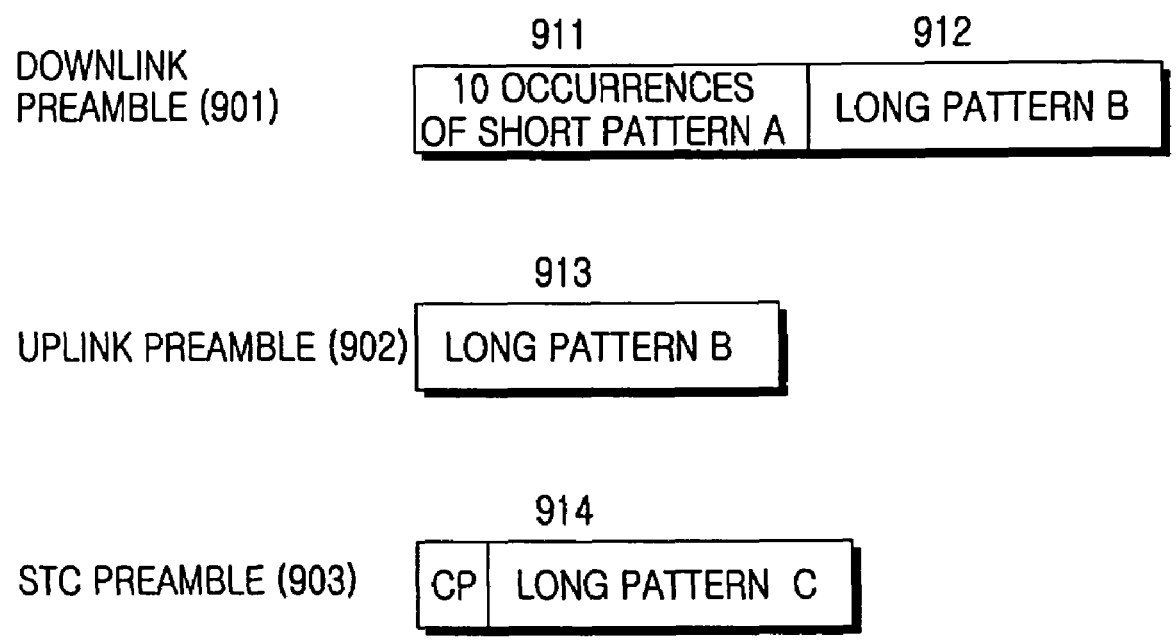
FIG. 9 illustrates preamble sequences generated from the MPP generating apparatus illustrated in FIG. 2.

The structures of a downlink transmission frame and an uplink transmission frame will be described with reference to FIG. 9.

The downlink/uplink transmission frame is the same in structure to the conventional frame. The downlink transmission frame uses two preambles in concatenation, that is, a preamble 911 and a preamble 912. The preamble 911 is a short preamble produced by repeating an ARM code sequence of Pattern a of length 16 eight times and then inverting the sign of the ARM code sequence. That is, nine ARM code sequences of Pattern a and one sign-inverted ARM code sequence occur in the short preamble 911. The preamble 912 is a long preamble produced by repeating an ARM code sequence of Pattern b of length 256 once. That is, two ARM code sequences of Pattern b occur in the long preamble 912. A CP (Cyclic Prefix) is a repetition of the last few bits of data following the CP to prevent multipath interference. The uplink transmission frame has a long preamble 913 of length 256. The long preamble 913 is produced by repeating the ARM code sequence of Pattern b once. When a transmit diversity antenna is used, a data frame has an STC preamble 914 of length 256.

Here, the downlink preamble is obtained by concatenating the short preamble 911 and the long preamble 912. The short preamble 911 is obtained by inserting 11 nulls into a signal generated from the pattern a generator 304, performing 65-point IFFT operation on the resulting sequence, repeating the IFFT output eight times, and inverting the sign of the IFFT output. The long preamble 912 is obtained by inserting 55 nulls into a signal generated from the pattern b generator 305, performing 256-point IFFT operation on the resulting sequence, and repeating the IFFT output once.

Figure 6:
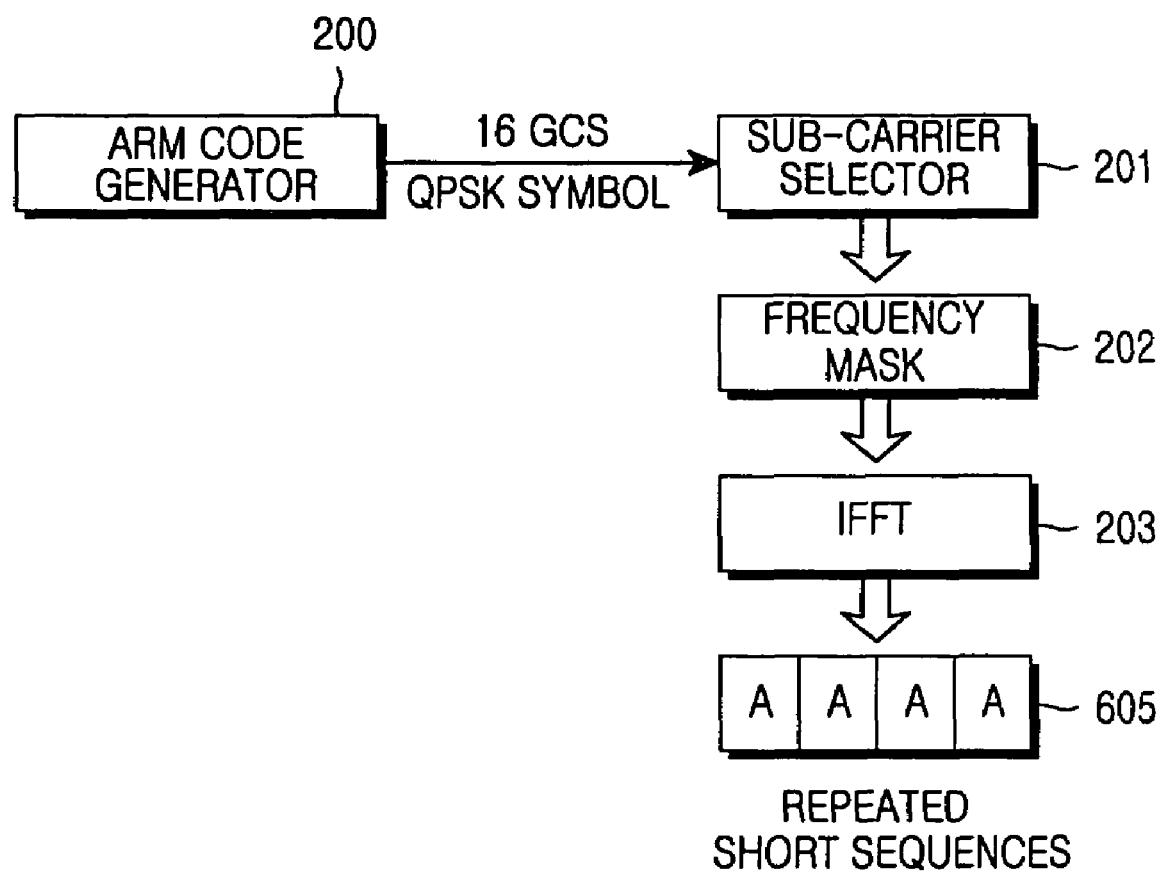
FIG. 6 schematically illustrates short preamble sequence generation in the MPP sequence generating apparatus illustrated in FIG. 2.

Generation of the short preamble sequence will be described with reference to FIG. 6. FIG. 6 illustrates a short preamble sequence generation procedure in the MPP sequence generating apparatus illustrated in FIG. 2.

Figure 10:
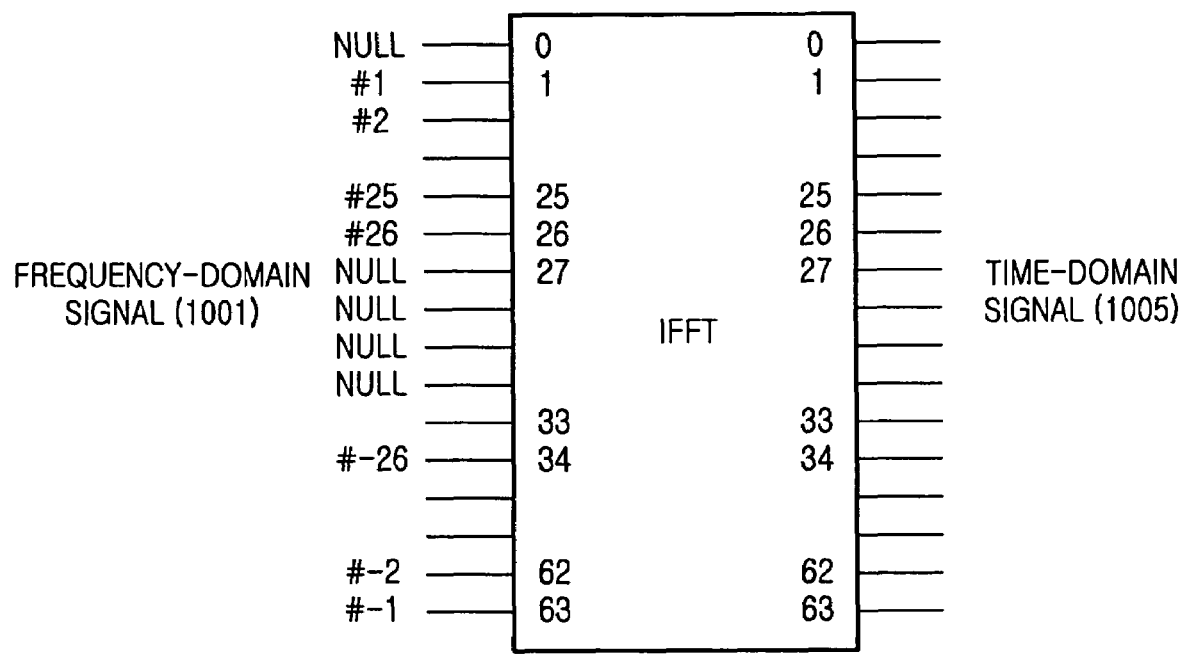
FIG. 10 illustrates a frequency mask according to another embodiment of the present invention.

Referring to FIG. 6, the ARM code generator 200 generates an ARM code sequence of length 16. The sub-carrier selector 201 selects 12 samples among the 16 samples of the ARM code sequence and assigns them to 53 sub-carriers from #−26 to #26 by inserting nulls to the 12 samples in Pattern a. The frequency mask 202 performs frequency-masking by inserting nulls to sub-carriers #27 to #37 input to the 64-point IFFT. FIG. 10 illustrates a frequency mask generator according to another embodiment of the present invention. As illustrated, the frequency mask frequency-masks signals in the frequency domain to be applied to the input of the IFFT 203.

The IFFT 203 performs 64-point IFFT on the output of the frequency mask 202 and generates a preamble sequence 605 in the time domain in which the Pattern a occurs four times.

Figure 7:
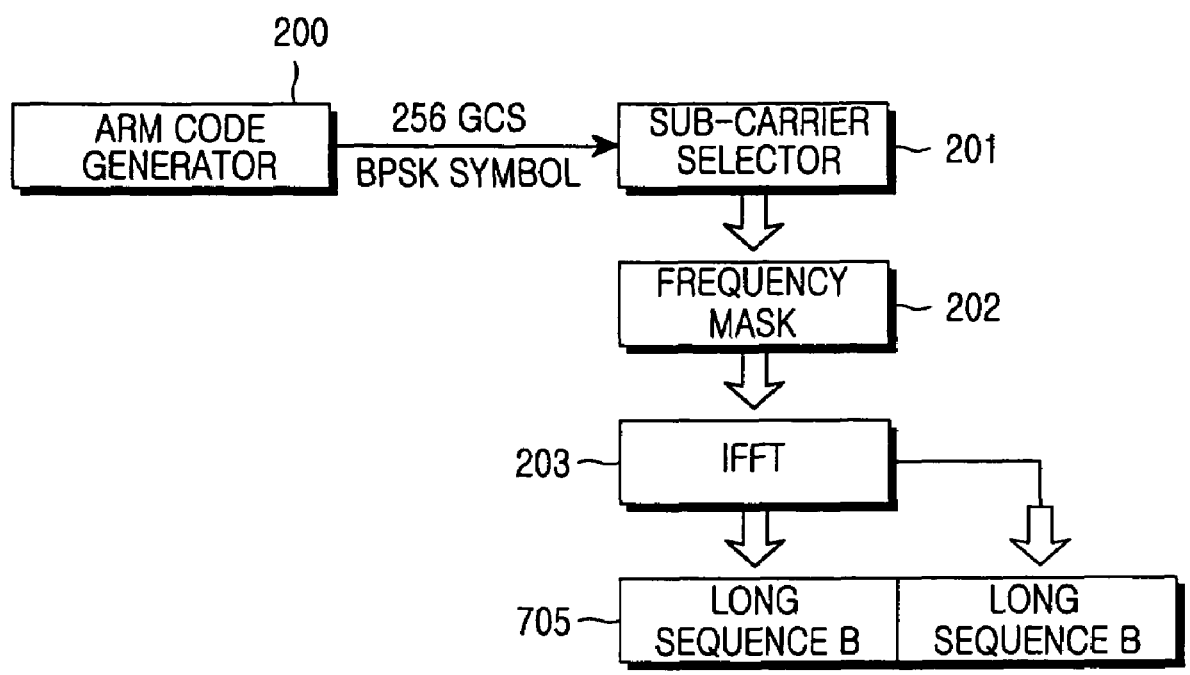
FIG. 7 schematically illustrates long preamble sequence generation in the MPP sequence generating apparatus illustrated in FIG. 2.

Generation of the long preamble sequence will be described with reference to FIG. 7. FIG. 7 illustrates a long preamble sequence generation procedure in the MPP sequence generating apparatus illustrated in FIG. 2.

Figure 11:
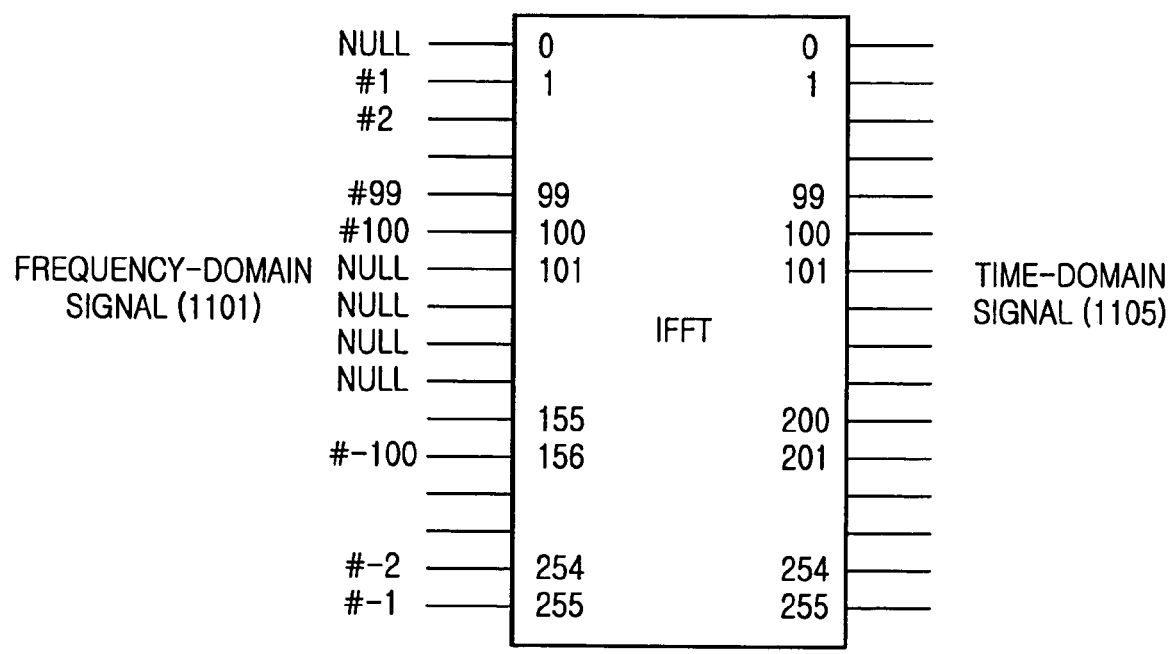
FIG. 11 illustrates a frequency mask according to a third embodiment of the present invention.

Referring to FIG. 7, the ARM code generator 200 generates an ARM code sequence of length 256. The sub-carrier selector 201 selects 200 samples among the 256 samples of the ARM code sequence and assigns them to 201 sub-carriers from #−100 to #100 in Pattern b. The frequency mask 202 performs frequency-masking by inserting nulls to sub-carriers #101 to #155 input to the 256-point IFFT. FIG. 11 illustrates a frequency mask generator according to a third embodiment of the present invention. As illustrated, the frequency mask frequency-masks signals in the frequency domain to be applied to the input of the 256-point IFFT. The IFFT 203 performs 256-point IFFT on the output of the frequency mask 202 and generates a preamble sequence 705 in the time domain in which the Pattern b occurs twice.

Figure 8:
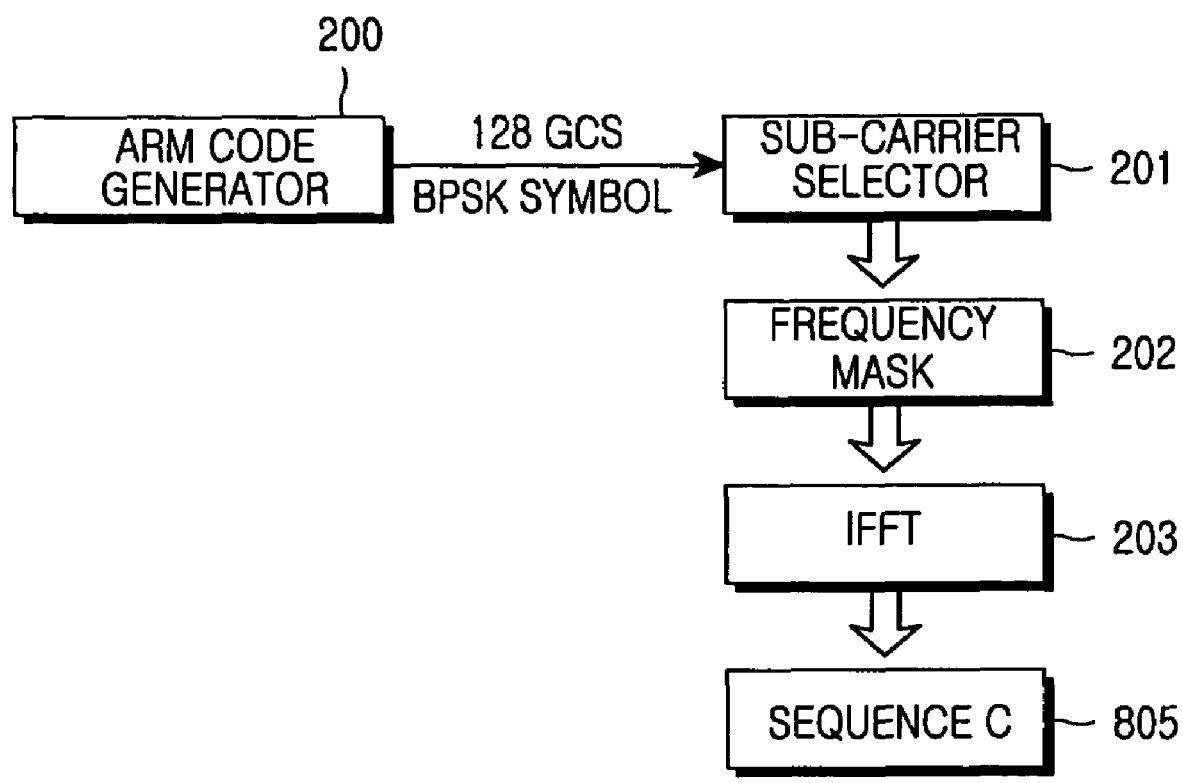
FIG. 8 schematically illustrates STC preamble sequence generation in the MPP sequence generating apparatus illustrated in FIG. 2.

Generation of an STC preamble sequence will be described with reference to FIG. 8. FIG. 8 illustrates an STC preamble sequence generation procedure in the MPP sequence generating apparatus illustrated in FIG. 2.

Referring to FIG. 8, the ARM code generator 200 generates an ARM code sequence of length 128. The sub-carrier selector 201 selects 102 samples among the 128 samples of the ARM code sequence and assigns them to 201 sub-carriers from #100 to #100 in Pattern c. The frequency mask 202 performs frequency-masking by inserting nulls to sub-carriers #101 to #155 input to the 256-point IFFT. The IFFT 203 performs 256-point IFFT on the output of the frequency mask 202 and generates an STC preamble sequence 805 in the time domain.

As described above, a BWA communication system selects a downlink/uplink preamble and an STC preamble having excellent PAPR and correlation characteristics. Distortion of signal output during RF transmission caused by bad PAPR characteristics leads to decreased signal acquisition performance and makes synchronization acquisition difficult, thereby resulting in impossible communication. If the downlink/uplink preamble and the STC preamble indicating the presence or absence of data are not acquired, the data cannot be received. If frequency synchronization being a function offered by the preambles is not acquired, tens of bits to hundreds of bits mapped to one symbol are distorted and thus a whole data block is lost. These preambles use burst technology.

In general, a sequence of S(f) is called an aperiodic sequence in relation to calculating its correlation. After IFFT, a signal S(t) is good if it has a low PAPR and has a low cross correlation value. That is, if synchronization is not acquired, a sequence having a low auto-correlation value is good. If synchronization is acquired, a sequence having a high auto-correlation value is good. However, an aperiodic sequence having an excellent PAPR performance is not known in reality. Therefore, the present invention proposes an ARM code that is excellent as an aperiodic sequence for application to the downlink/uplink preamble and the STC preamble. Even if the ARM code is shortened, that is, part of the samples of the ARM code are lost, its PAPR performance after IFFT is not decreased and its auto-correlation value is high. Therefore, a preamble sequence from the ARM code is excellent in performance relative to an existing preamble used in the conventional BWA/WLAN system.

In accordance with the present invention, downlink/uplink and STC preamble sequences with a minimum PAPR are generated using ARM codes in a BWA communication system. Therefore, a synchronization acquisition probability is maximized and thus the overall system performance is improved. Furthermore, preamble sequences of various lengths can be generated in a relatively simple hardware.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A preamble sequence generating method in a BWA (Broadband Wireless Access) communication system using OFDM (Orthogonal Frequency Division Multiplexing) for frequency synchronization and channel estimation, comprising the steps of:

generating at least one ARM (Aperiodic Recursive Multiplex) code by outputting a third sequence by multiplying a first sequence having a first length and a second sequence having the first length containing alternating +1s and −1s, outputting a fourth sequence by time-multiplexing the first sequence and the third sequence, and resetting the fourth sequence as the first sequence until an intended length of the ARM code is achieved;

mapping the samples of the ARM code to sub-carriers equally distributed in a frequency band; and generating a preamble sequence by performing IFFT (Inverse Fast Fourier Transform) on sub-carriers containing ARM code samples remaining from deleting a predetermined number of ARM code samples from the ARM code samples, a reference component representing a DC component, and null components inserted between the remaining ARM code samples and the reference component, wherein the preamble sequence is used for frequency synchronization and channel estimation.

2. The preamble sequence generating method of claim 1, wherein the predetermined ARM code samples are deleted to prevent adjacent channel interference.

3. The preamble sequence generating method of claim 1, wherein the DC component is mapped to a sub-carrier having a minimum frequency among the sub-carriers.

4. A preamble sequence generating apparatus in a BWA (Broadband Wireless Access) communication system using OFDM (Orthogonal Frequency Division Multiplexing), comprising:

an ARM (Aperiodic Recursive Multiplex) code generator for generating at least one ARM code by outputting a third sequence by multiplying a first sequence having a first length and a second sequence having the first length containing alternating +1s and −1s, outputting a fourth sequence by time-multiplexing the first sequence and the third sequence, and resetting the fourth sequence as the first sequence until an intended length of the ARM code is achieved;

a sub-carrier selection and frequency mask unit for mapping the samples of the ARM code to sub-carriers equally distributed in a frequency band; and an IFFT (Inverse Fast Fourier Transformer) for generating a preamble sequence by inverse-fast-Fourier-transforming sub-carriers containing ARM code samples remaining from deleting a predetermined number of ARM code samples from the ARM code samples, a reference component representing a DC component, and null components inserted between the remaining ARM code samples and the reference component.

5. The preamble sequence generating apparatus of claim 4, wherein the predetermined ARM code samples are deleted to prevent adjacent channel interference.

6. The preamble sequence generating apparatus of claim 4, wherein the DC component is mapped to a sub-carrier having a minimum frequency among the sub-carriers.

7. A preamble sequence generating apparatus in a BWA (Broadband Wireless Access) communication system using OFDM (Orthogonal Frequency Division Multiplexing), comprising:

an ARM (Aperiodic Recursive Multiplex) code generator for generating at least one ARM code by outputting a third sequence by multiplying a first sequence having a first length and a second sequence having the first length containing alternating +1s is and −1s, outputting a fourth sequence by time-multiplexing the first sequence and the third sequence, and resetting the fourth sequence as the first sequence until an intended length of the ARM code is achieved;

a sub-carrier selection and frequency mask unit for one-to-one mapping a second number of ARM code components to a second number of sub-carriers among a third number of sub-carriers equally distributed in a frequency band, the second number being the number of the components of the ARM code, minus, a DC component and a first number of ARM code components set to prevent adjacent channel interference, and mapping null components to sub-carriers excluding from the second number of sub-carriers; and an IFFT (Inverse Fast Fourier Transformer) for generating a preamble sequence by inverse-fast-Fourier-transforming the sub-carriers received from the sub-carrier selection and frequency mask unit.

8. The preamble sequence generating apparatus of claim 7, wherein the first number of ARM code components are mapped to outermost sub-carriers in the frequency band.

9. The preamble sequence generating apparatus of claim 7, wherein the DC component is mapped to a sub-carrier having a minimum frequency among the sub-carriers.

10. The preamble sequence generating apparatus of claim 7, further comprising a preamble assembler for generating a different preamble sequence by using preamble sequences output from the IFFT individually or in combination.

11. A preamble sequence generating method in a BWA (Broadband Wireless Access) communication system using OFDM (Orthogonal Frequency Division Multiplexing) for frequency synchronization and channel estimation, comprising the steps of:

generating at least one ARM (Aperiodic Recursive Multiplex) code by outputting a third sequence by multiplying a first sequence having a first length and a second sequence having the first length containing alternating +1s and −1s, outputting a fourth sequence by time-multiplexing the first sequence and the third sequence, and resetting the fourth sequence as the first sequence until an intended length of the ARM code is achieved;

one-to-one mapping a second number of ARM code components to a second number of sub-carriers among a third number of sub-carriers equally distributed in a frequency band, the second number being the number of the components of the ARM code, minus, a DC component and a first number of ARM code components set to prevent adjacent channel interference, and mapping null components to sub-carriers excluding from the second number of sub-carriers; and generating a preamble sequence by inverse-fast-Fourier-transforming the sub-carriers mapped to the second number of ARM code components and the null components, wherein the preamble sequence is used for frequency synchronization and channel estimation.

12. The preamble sequence generating method of claim 11, wherein the first number of ARM code components are mapped to outermost sub-carriers in the frequency band.

13. The preamble sequence generating method of claim 11, wherein the DC component is mapped to a sub-carrier having a minimum frequency among the sub-carriers.

14. The preamble sequence generating method of claim 11, further comprising the step of generating a different preamble sequence by using preamble sequences output from the IFFT individually or in combination.

* * * * *